(12) United States Patent
Kizhakkepat et al.

(10) Patent No.: US 12,221,207 B2
(45) Date of Patent: Feb. 11, 2025

(54) INNER MEMBER FOR MAIN ROTOR CENTRIFUGAL FORCE BEARING

(71) Applicant: Textron Innovations Inc., Providence, RI (US)

(72) Inventors: Amarjit Kizhakkepat, Fort Worth, TX (US); Mark Adam Wiinikka, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/347,737

(22) Filed: Jul. 6, 2023

(65) Prior Publication Data

US 2025/0010982 A1 Jan. 9, 2025

(51) Int. Cl.
*B64C 27/37* (2006.01)
*B64C 27/35* (2006.01)

(52) U.S. Cl.
CPC .............. *B64C 27/37* (2013.01); *B64C 27/35* (2013.01)

(58) Field of Classification Search
CPC ................................. B64C 27/37; B64C 27/35
See application file for complete search history.

(56) References Cited

U.S. PATENT DOCUMENTS

| | | | |
|---|---|---|---|
| 5,460,487 A * | 10/1995 | Schmaling | B64C 27/51 416/61 |
| 5,601,408 A | 2/1997 | Hunter et al. | |
| 8,926,281 B2 | 1/2015 | Stamps et al. | |
| 9,085,357 B2 * | 7/2015 | Davis | B64C 27/35 |
| 10,836,476 B2 * | 11/2020 | Wiinikka | B64C 27/37 |
| 10,864,985 B2 | 12/2020 | McCullough et al. | |

* cited by examiner

*Primary Examiner* — Courtney D Heinle
*Assistant Examiner* — John S Hunter, Jr.
(74) *Attorney, Agent, or Firm* — Bradley Arant Boult Cummings LLP

(57) ABSTRACT

A back-to-back spherical bearing assembly for a rotary system of a rotary aircraft includes a spherical bearing member having an interior cavity and a spherical bearing surface defining a bearing focal point, a first elastomeric and a second elastomeric bonded to the spherical bearing surface on opposite sides of the bearing focal point, an inboard attachment bonded to the first elastomeric and configured to be secured to a rotor hub of the rotary system, and an outboard attachment bonded to the second elastomeric and configured to be secured to a rotor blade of the rotary system.

13 Claims, 7 Drawing Sheets

INNER MEMBER FOR MAIN ROTOR CENTRIFUGAL FORCE BEARING

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to elastomeric bearings, and more particularly, but not by way of limitation, to a centrifugal force bearing for use between a rotor hub and a rotor blade in a rotary system of a rotary aircraft.

BACKGROUND

This section provides background information to facilitate a better understanding of the various aspects of the disclosure. It should be understood that the statements in this section of this document are to be read in this light, and not as admissions of prior art.

Conventional rotary systems are well known in the art for effectively reacting movement of an aircraft during flight. The rotary systems utilize a hub retention assembly as the primary structural for driving torque to and reacting loads created by a plurality of rotor blades rotatably attached thereto. In some embodiments, the rotary system employs one or more bearing assemblies to react blade forces exerted on the retention member, for example, lead/lag, coning, feathering, and centrifugal blade forces.

SUMMARY

An exemplary back-to-back spherical bearing includes a spherical bearing member having an interior cavity and a spherical bearing surface defining a bearing focal point, and a first elastomeric and a second elastomeric bonded to the spherical bearing surface on opposite sides of the bearing focal point.

Another exemplary back-to-back spherical bearing assembly for a rotary system of a rotary aircraft includes a spherical bearing member having an interior cavity and a spherical bearing surface defining a bearing focal point, a first elastomeric and a second elastomeric bonded to the spherical bearing surface on opposite sides of the bearing focal point, an inboard attachment bonded to the first elastomeric and configured to be secured to a rotor hub of the rotary system, and an outboard attachment bonded to the second elastomeric and configured to be secured to a rotor blade of the rotary system.

Another exemplary back-to-back spherical bearing assembly for a rotary system of a rotary aircraft includes a solid spherical bearing member formed of a chopped fiber composite having a spherical bearing surface defining a bearing focal point, a first elastomeric and a second elastomeric bonded to the spherical bearing surface on opposite sides of the bearing focal point, an inboard attachment bonded to the first elastomeric and configured to be secured to a rotor hub of the rotary system, and an outboard attachment bonded to the second elastomeric and configured to be secured to a rotor blade of the rotary system.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
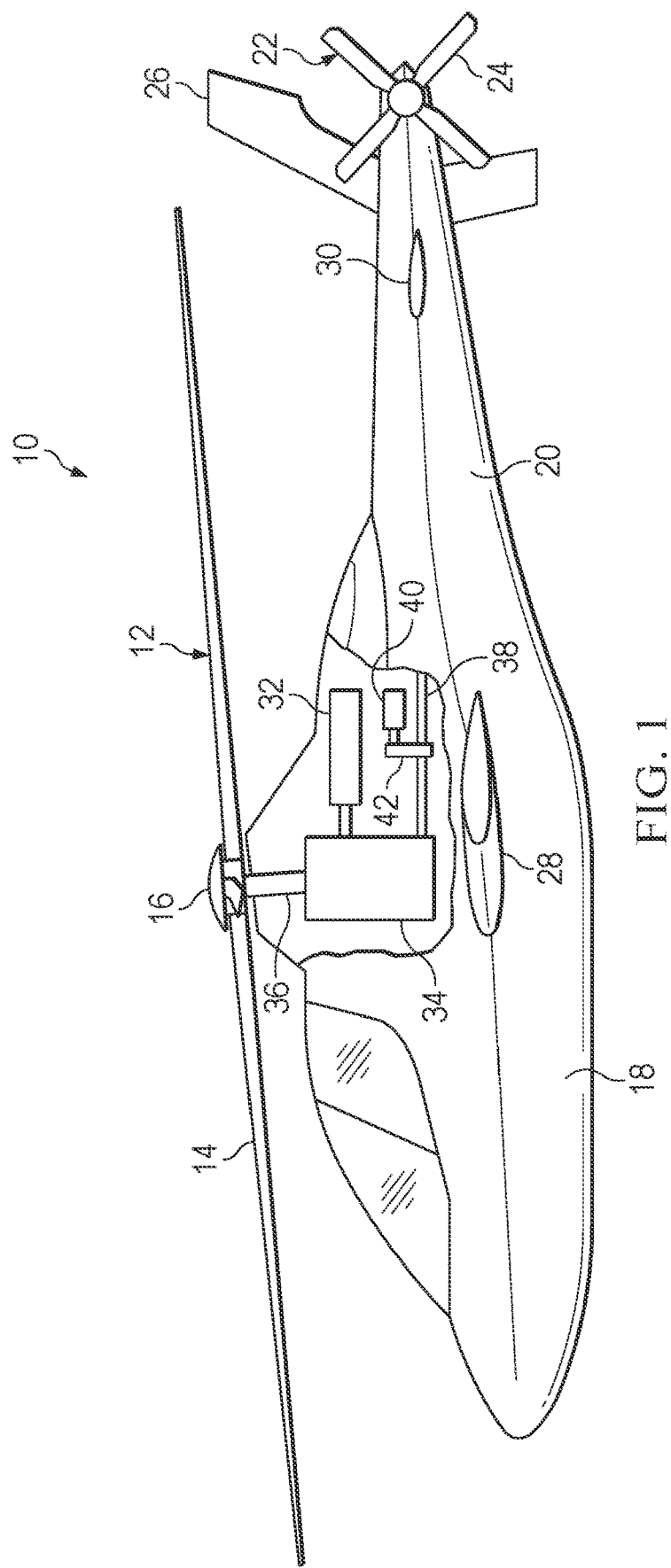
FIG. 1 illustrates an exemplary rotary aircraft implementing a main rotor centrifugal force bearing according to aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Referring to FIG. 1, a rotary aircraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust, and lift of helicopter 10. A tail boom 20 is coupled to fuselage 18 and extends from fuselage 18 in the aft direction. An anti-torque system 22 includes a tail rotor assembly 24 coupled to an aft end of tail boom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provides stabilization to helicopter 10 during high-speed forward flight. In addition, helicopter 10 includes wing members 28 that extend laterally from fuselage 18 and wing members 30 that extend laterally from tail boom 20. Wing members 28, 30 provide lift to helicopter 10 responsive to the forward airspeed of helicopter 10, thereby reducing the lift requirement on main rotor assembly 12 and increasing the top speed of helicopter 10.

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a supplemental engine 40, or supplemental power unit, is coupled to tail rotor drive shaft 38 by a supplemental engine gearbox 42 that provides suitable clutching therebetween.

Rotorcraft 10 is merely illustrative of a variety of aircraft that can implement the embodiments disclosed herein. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones, and the like. As such, those skilled in the art will recognize that the centrifugal force spherical bearing of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2:
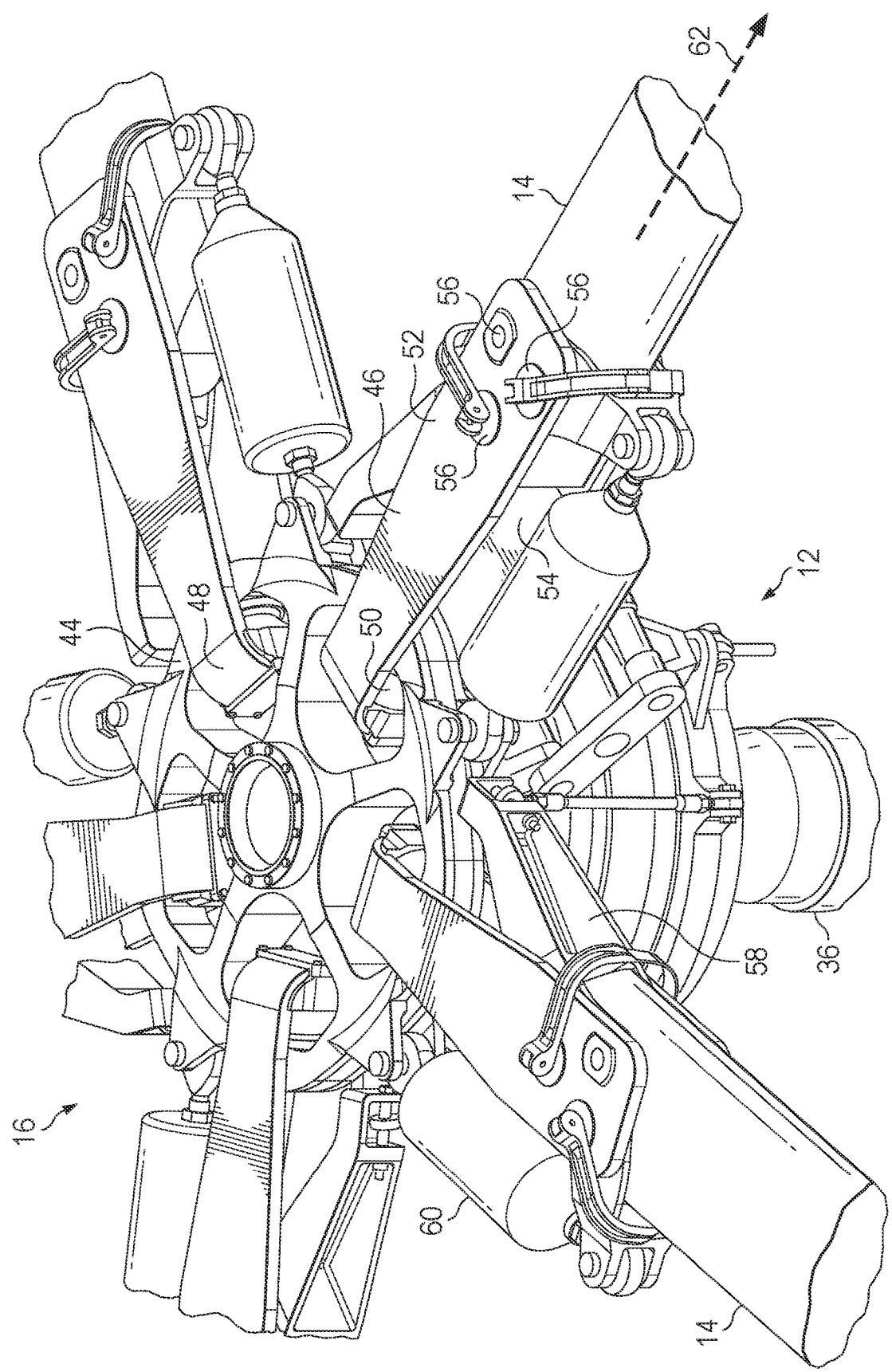
FIG. 2 illustrates a perspective view of an exemplary main rotor system incorporating a centrifugal force bearing according to one or more aspects of the disclosure.

FIG. 2 illustrates an exemplary main rotor system 12 in accordance with an embodiment. Rotor hub 16 includes a yoke 44 coupled to a mast 36. Each rotor blade 14 is coupled to yoke 44 with a grip 46. An inboard portion 48 of each grip 46 is secured within an opening of yoke 44 with a centrifugal force (CF) bearing 50. CF bearing 50 is in the form of a back-to-back spherical bearing that reacts flapping, feathering motion and the CF load in the in the rotor hub. The back-to-back bearing configuration reduces the overall height of the bearing and hence the rotor hub reducing drag compared to a typical spherical bearing since both halves of the back-to-back spherical bearing share motions.

Grip 46 is a single substantially continuous member having an upper extension 52 and a lower extension 54. Rotor blade 14 is attached to the outboard portion of grip 46 with bolts 56. Pitch horn 58 is interposed between rotor blade 14 and upper and lower extensions 52, 54 of grip 46. Damper 60 is attached between yoke 44 and a damper attachment portion of pitch horn 58.

During operation, dynamic forces act on rotor blade 14 and associated components of rotor system 12. Primary dynamic forces include a combination of centrifugal force loading in a centrifugal force direction 62, a chord-wise bending in a bending direction, and a beam-wise bending in a bending direction. Such loading is addressed by the attachment mechanism used to attach rotor blade 14 to grip 46. Additionally, torsional loading about pitch change axis can be experienced from aerodynamic loading, as well as pitch change inputs from pitch horn 58.

Figure 3:
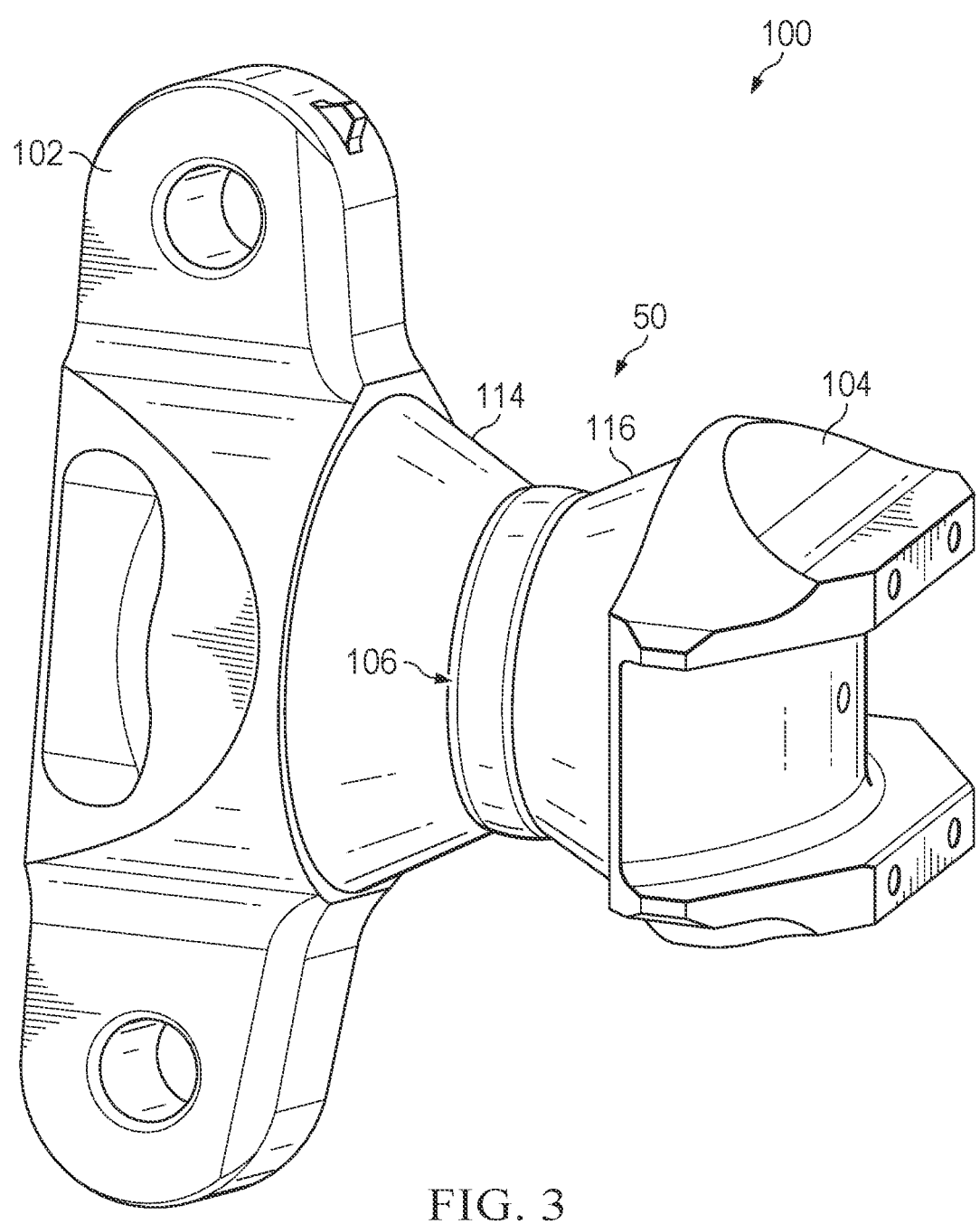
FIG. 3 illustrates an exemplary centrifugal force bearing assembly for a rotary system of a rotary aircraft according to one or more aspects of the disclosure.
Figure 4:
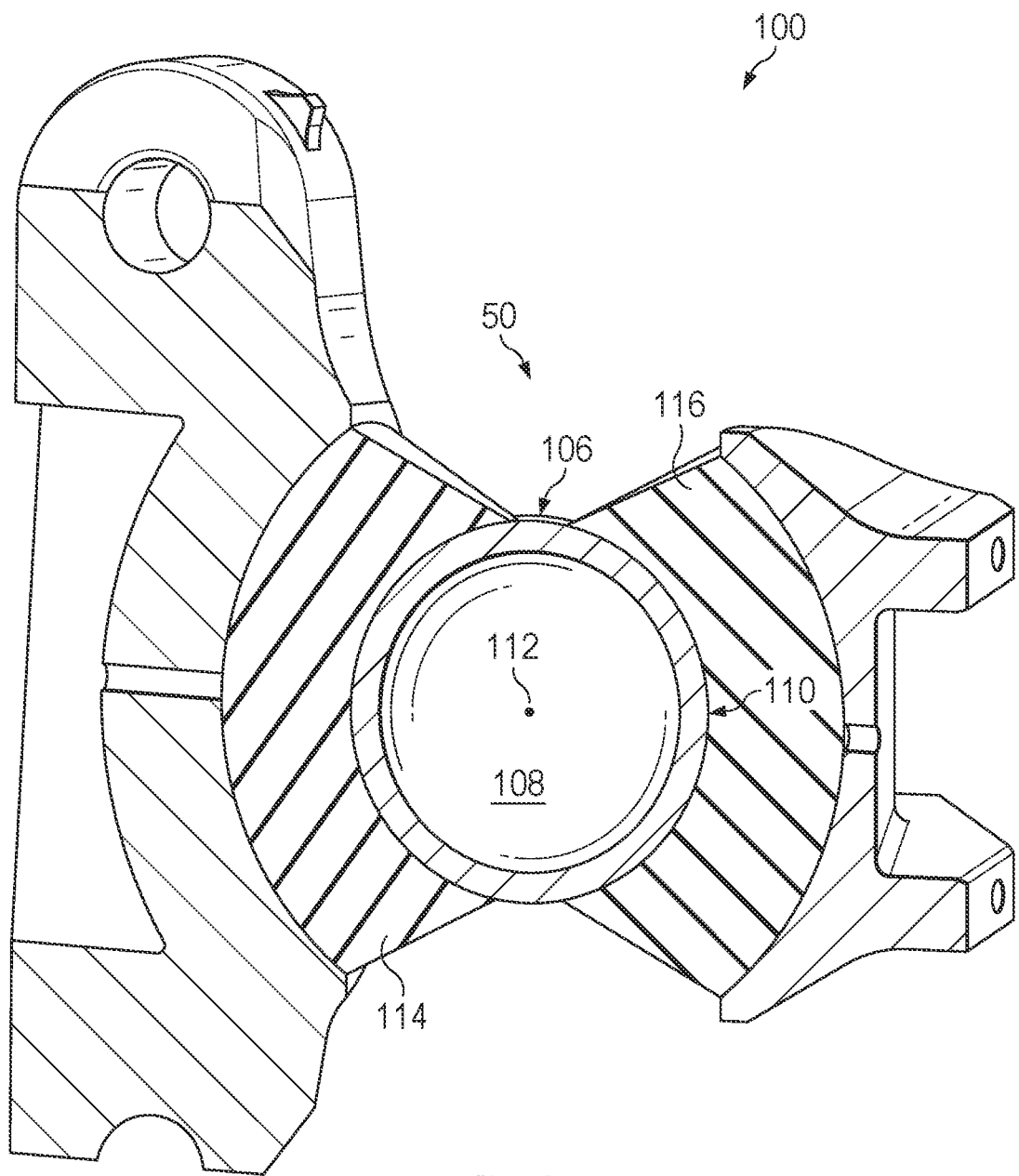
FIG. 4 is a partial sectional view of the exemplary centrifugal force bearing assembly of FIG. 3.
Figure 5:
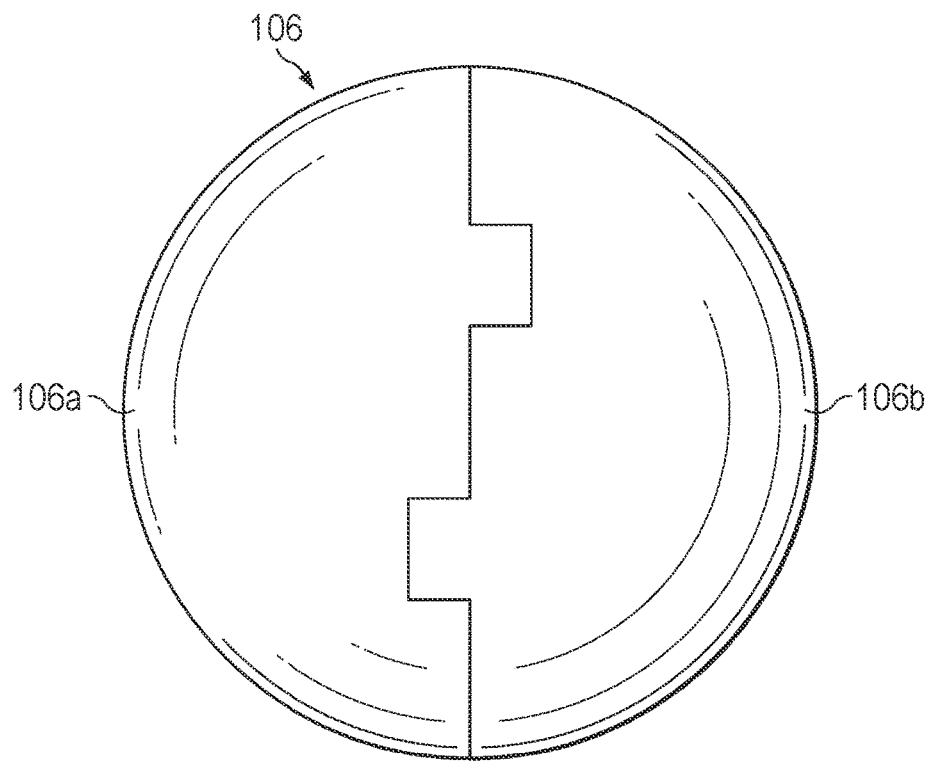
FIG. 5 illustrates an exemplary hollow inner spherical bearing member formed of two or more interconnected portions.

FIGS. 3 and 4 illustrate an exemplary centrifugal force (CF) bearing assembly 100 for a rotary system of a rotary aircraft, which is described with reference to FIGS. 1 and 2. CF bearing assembly 100 includes a CF bearing 50 with an inboard attachment 102 configured to attach to a rotor hub 16, e.g., yoke 44, and an outboard attachment 104 configured to attached to rotor blade 14, e.g., grip 46.

CF bearing 50 is a back-to-back spherical bearing. CF bearing 50 includes an inner spherical bearing member 106, e.g., a hollow member, having an interior cavity 108 and a spherical bearing surface 110 (outer surface) defining a bearing focal point 112. A first elastomeric 114 and a second elastomeric 116 are bonded to spherical bearing surface 110 on opposite sides of bearing focal point 112. Inboard attachment 102 is bonded to first elastomeric 114 and outboard attachment 104 is bonded to second elastomeric 116. In an exemplary embodiments, the inboard and outboard attachments are made of a metal such as titanium.

Heretofore the central bearing element is a solid metal member. In FIGS. 3-8, spherical bearing member 106 is a hollow member reducing the weight of the CF bearing assembly. In an exemplary embodiment, spherical bearing element 106 is constructed of a metal, for example aluminum, and hollow bearing member 106 reduces the weight of a rotary aircraft using four CF bearing assemblies by greater than three pounds compared to using similar bearing assemblies having solid aluminum spherical bearing members.

In an exemplary embodiment, hollow spherical bearing member 106 is continuous metal member that may fully enclose the interior cavity. In another exemplary embodiment, illustrated in FIG. 5, spherical bearing member 106 is formed of two or more interconnected portions 106a, 106b. The two or more interconnected portions 106a, 106b, may fully enclose the interior cavity.

Figure 6:
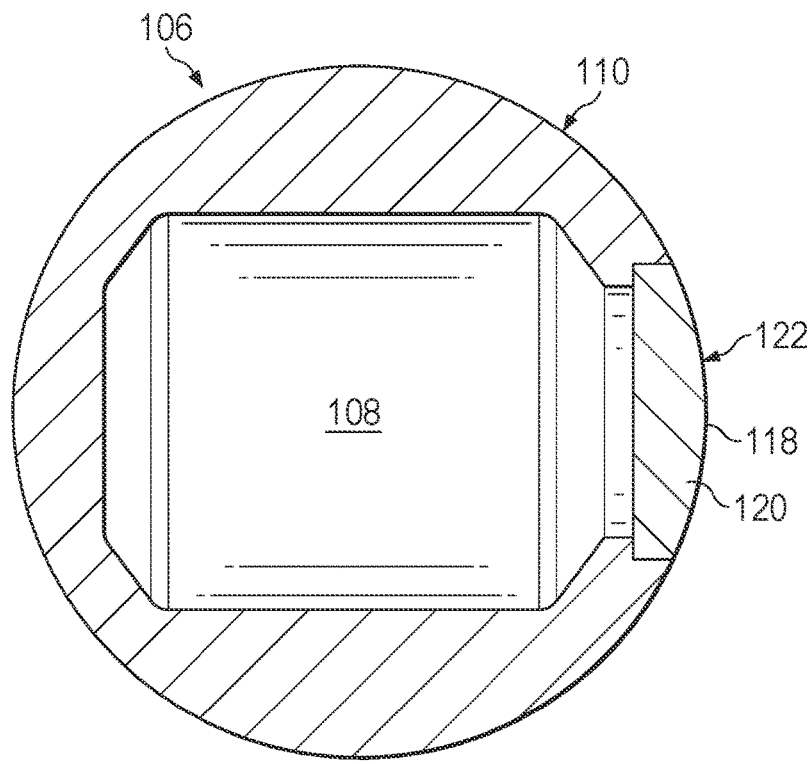
FIG. 6 is a sectional view of an exemplary hollow spherical bearing member having an opening into the interior cavity.

FIG. 6 is a sectional view of an exemplary hollow spherical bearing member 106. Spherical bearing member 106 has an opening 118 in spherical bearing surface 110 into interior cavity 108. Opening 118 may be formed to bore interior cavity 108. One of first elastomeric 114 or second elastomeric 116 (FIGS. 2-3) may be bonded to bearing surface 110 covering opening 118. In the embodiment illustrated of FIG. 6, opening 118 may be closed with a plug 120 constructed of a second material separate from the spherical bearing member. Plug 120 may be the same type of material as spherical bearing member 106. Plug 120 may be press-fit in opening 118. Plug 120 has an outer surface 122 that may be contoured to match bearing surface 110.

Figure 7:
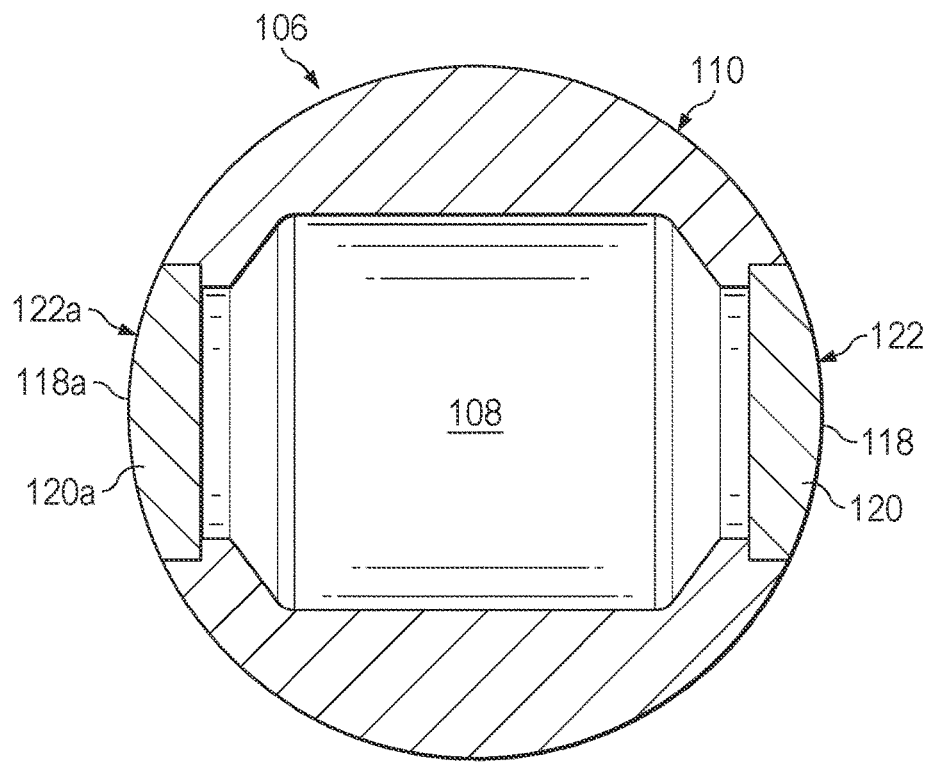
FIG. 7 is a sectional view of an exemplary hollow spherical bearing member having a pair of openings connected to the interior cavity forming a throughbore.

FIG. 7 illustrates an embodiment of a hollow spherical bearing member 106 providing additional weight savings compared to hollow spherical bearing member 106 illustrated in FIG. 6. In this exemplary embodiment, spherical bearing member 106 includes a first opening 118 and a second opening 118a in spherical bearing surface 110 into interior cavity 108. In the illustrated embodiment, first opening 118, interior cavity 108, and second opening 118a form a throughbore. One of first elastomeric 114 or second elastomeric 116 (FIGS. 2-3) may be bonded to bearing surface 110 covering opening 118 and the other one of first elastomeric 114 or second elastomeric 116 may be bonded to bearing surface 110 covering opening 118a. In the embodiment illustrated of FIG. 7, opening 118 may be closed with a plug 120. Plug 120 may be press-fit in opening 118. Plug 120 has an outer surface 122 that may be contoured to match bearing surface 110. Similarly, a second plug 120*a* may be used to close second opening 118*a*. An outer surface 122*a* of second plug 120*a* may be contoured to match spherical bearing surface 110.

Inner spherical bearing member 106 is described with reference to FIGS. 3-7 as a metal member, such as aluminum. However, spherical bearing member 106 may be constructed of a composite, such as an additive printed member of chopped fiber composite. A chopped fiber composite may be used instead of aluminum since the inner spherical bearing member is primarily loaded in compression.

Figure 8:
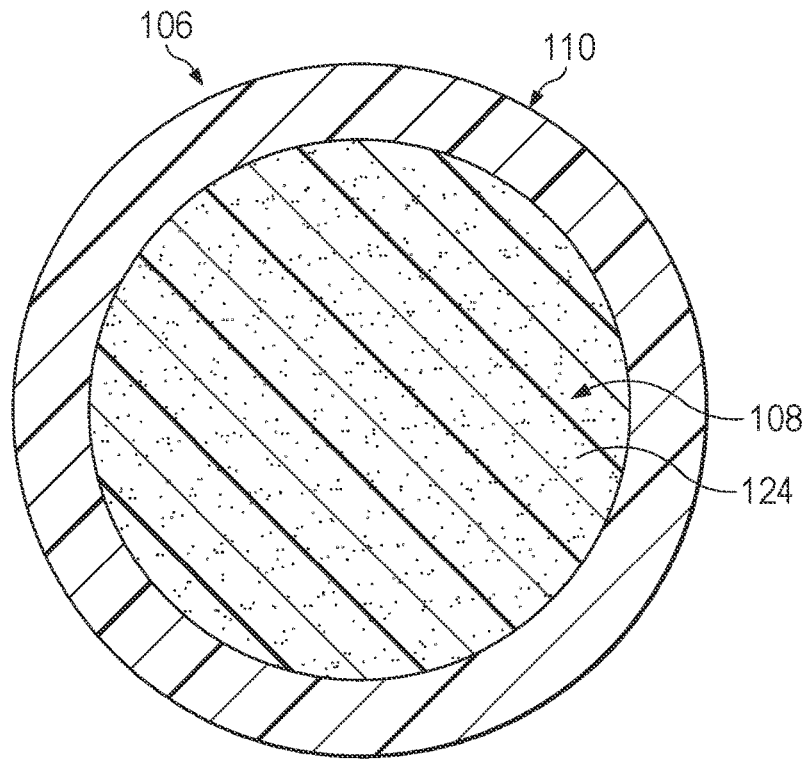
FIG. 8 is sectional view of an exemplary hollow spherical bearing member formed of a chopped fiber composite.
Figure 9:
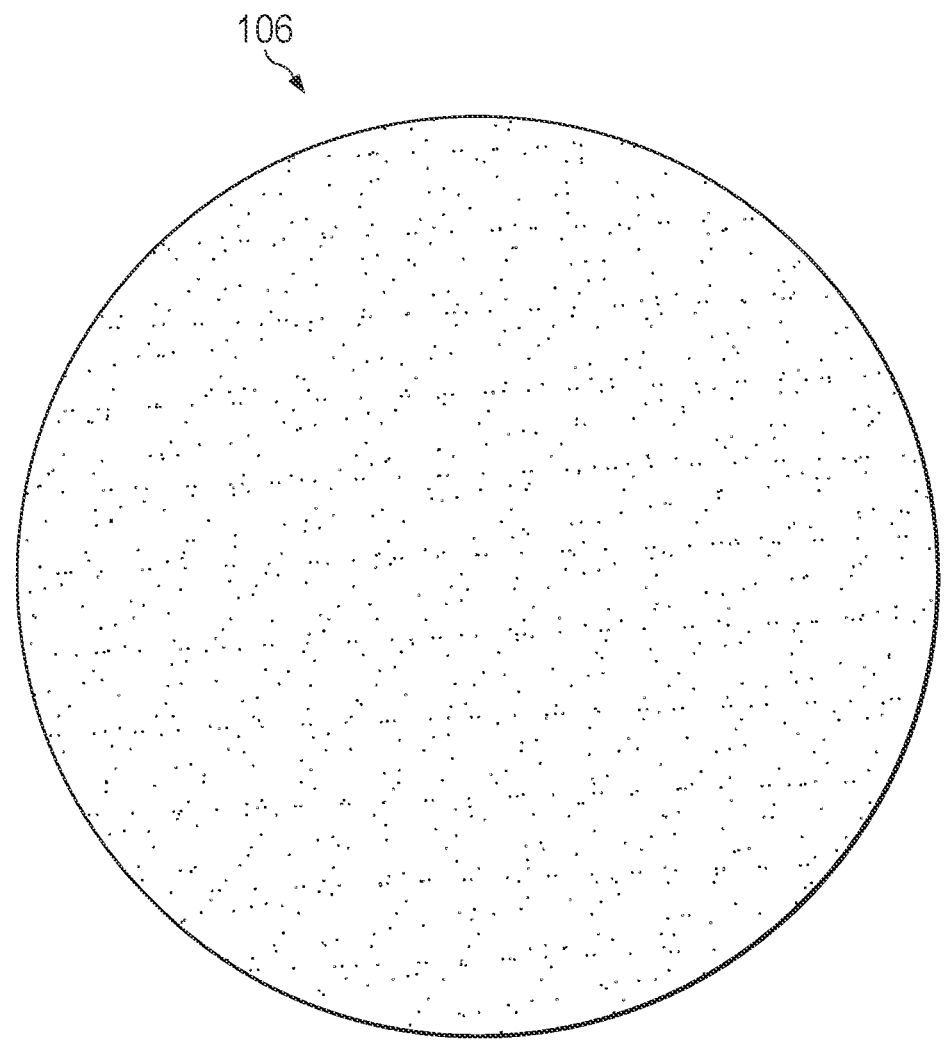
FIG. 9 illustrates a solid inner spherical bearing member formed of a chopped fiber composite.

FIGS. 8 and 9 illustrate additional exemplary inner spherical bearing members 106 constructed of a chopped fiber composite. FIG. 8 is a sectional view of an inner spherical bearing member 106 formed of chopped fiber composite with an interior cavity 108 and spherical bearing surface 110. In FIG. 8, interior cavity 108 contains a second material 124, such as foam, having a lower density than the chopped fiber composite forming spherical bearing member 106. Second material 124 may provide support to 3D print spherical bearing member 106 with an interior cavity 108.

FIG. 9 illustrates an exemplary solid inner spherical bearing member 106 formed of a chopped fiber composite.

Although relative terms such as "outer," "outboard," "inner," "inboard," "upper," "lower," and similar terms have been used herein to describe a spatial relationship of one element to another, it is understood that these terms are intended to encompass different orientations of the various elements and components in addition to the orientation depicted in the figures. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. The terms "substantially," "approximately," "generally," and "about" are defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A back-to-back spherical bearing, comprising:
    a spherical bearing member having an interior cavity and a spherical bearing surface defining a bearing focal point; and
    a first elastomeric and a second elastomeric bonded to the spherical bearing surface on opposite sides of the bearing focal point;
    wherein a distance from the bearing focal point to any point on the spherical bearing surface is identical;
    wherein the spherical bearing member has a first opening and a second opening formed opposite each other in the spherical bearing surface into the interior cavity;
    wherein the first opening, the interior cavity, and the second opening form a throughbore.

2. The back-to-back spherical bearing of claim 1, wherein the spherical bearing member is a metal member.

3. The back-to-back spherical bearing of claim 2, wherein one of the first elastomeric or the second elastomeric is positioned over the first opening.

4. The back-to-back spherical bearing of claim 2, wherein one of the first elastomeric or the second elastomeric is positioned over the second opening.

5. The back-to-back spherical bearing of claim 1, further comprising:
    a first plug closing the first opening, the first plug having an outer surface that is contoured to match the spherical bearing surface; and
    a second plug closing the second opening, the second plug having an outer surface that is contoured to match the spherical bearing surface.

6. The back-to-back spherical bearing of claim 1, wherein the spherical bearing member is a metal member formed of two or more interconnected portions fully enclosing the interior cavity.

7. The back-to-back spherical bearing of claim 1, wherein the spherical bearing member is a continuous chopped fiber composite member.

8. A back-to-back spherical bearing assembly for a rotary system of a rotary aircraft, the back-to-back spherical bearing assembly comprising:
    a spherical bearing member having an interior cavity and a spherical bearing surface defining a bearing focal point;
    a first elastomeric and a second elastomeric bonded to the spherical bearing surface on opposite sides of the bearing focal point;
    an inboard attachment bonded to the first elastomeric and configured to be secured to a rotor hub of the rotary system; and
    an outboard attachment bonded to the second elastomeric and configured to be secured to a rotor blade of the rotary system;
    wherein a distance from the bearing focal point to any point on the spherical bearing surface is identical;
    wherein the spherical bearing member comprises an opening formed in the spherical bearing surface into the interior cavity, the opening being closed with a plug having an outer surface that is contoured to match the spherical bearing surface.

9. The back-to-back spherical bearing assembly of claim 8, wherein the spherical bearing member is a metal member formed of two or more interconnected portions fully enclosing the interior cavity.

10. The back-to-back spherical bearing assembly of claim 8, wherein the spherical bearing member is a continuous chopped fiber composite member.

11. The back-to-back spherical bearing assembly of claim 10, wherein the interior cavity contains a second material having a lower density than the continuous chopped fiber composite member.

12. The back-to-back spherical bearing assembly of claim 8, wherein one of the first elastomeric or the second elastomeric is positioned over the opening.

13. The back-to-back spherical bearing assembly of claim 8, wherein the inboard attachment is secured to the rotor hub and the outboard attachment is secured to the rotor blade, whereby in operation of the rotary system the back-to-back spherical bearing assembly reacts flapping and feather motion of the rotor blade and centrifugal force load.

* * * * *